May 5, 1931. W. J. HANIG 1,803,702
TRACTION WHEEL
Filed March 24, 1930
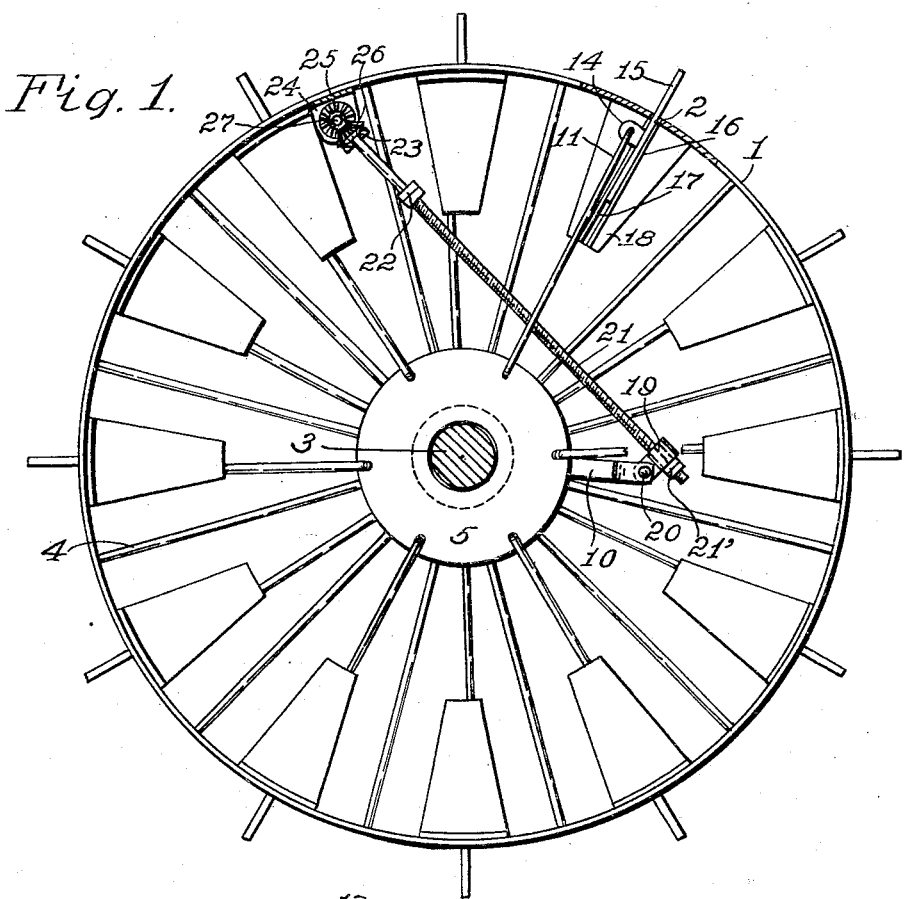
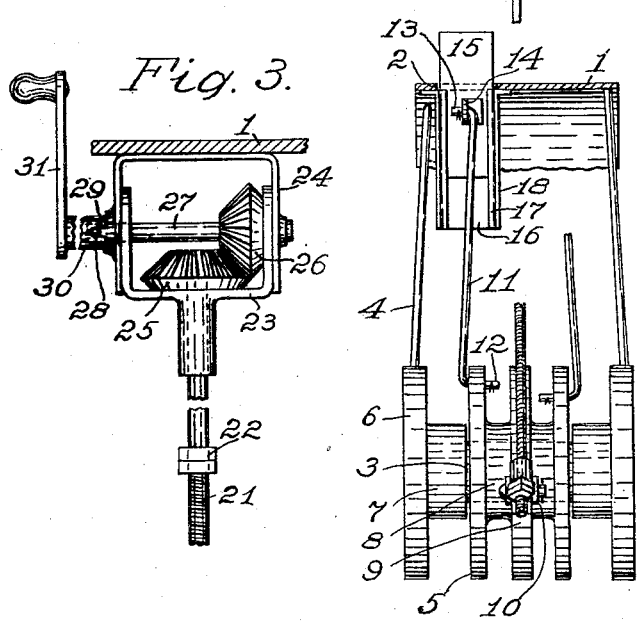
INVENTOR
W. J. Hanig,
BY
G. C. Kennedy
ATTORNEY Patented May 5, 1931

1,803,702

UNITED STATES PATENT OFFICE

WILLIAM J. HANIG, OF ACKLEY, IOWA

TRACTION WHEEL

Application filed March 24, 1930. Serial No. 438,506.

My invention relates to improvements in traction wheels, and the object of my improvement is to supply traction lugs for a traction wheel which are mounted thereon to be projected adjustingly radially outwardly from the tire thereof, or which may be retracted entirely within the circumferential outer periphery of the tire.

Another object of my improvement is to furnish adjustable actuating mechanism mounted upon the wheel for manual operation in said radial movements of the traction lugs.

These objects I have accomplished by the means which are hereinafter described and claimed, and which are illustrated in the accompanying drawings, in which Fig. 1 is a side elevation of a traction wheel equipped with my adjustable traction lugs and mechanism for actuating them, with parts shown in section. Fig. 2 is a fragmental cross section of said wheel showing the lug operating connections in front elevation, other elements being broken away. Fig. 3 is a detail front elevation in partial section and with a part of the operating shaft broken away, of the gearing used as actuating means in said mechanism, and on an enlarged scale.

Various minor modifications may be made in said devices without departing from my invention or from the appended claim.

I have shown in Fig. 1 a traction wheel, such as is used for a tractor or other vehicle, having a shaft and hub member 3 concentric with a wide tire 1. The hub and tire are rigidly connected by spokes 4 connected between said tire and annular parts 6 on the ends of the hub 3. The middle part 3 of the hub is of less diameter than the outwardly abutting parts 7 or the said parts 6, the parts 7 serving as stops for a sleeve 8 mounted rotatably on the part 3. This sleeve has a medial annular part 9 and like parts 5 at opposite ends thereof and spaced therefrom, all of the same diameter. The middle annulus 9 has a radial arm 10 with end furcations between which is pivoted on a pintle 20 a swinging and apertured bearing block 19, the aperture wall having a thread to mesh with an end part of a screw-rod 21 seated therein with adjusting nuts 21' thereon. The opposite part of the screw-rod 21 has other adjusting nuts 22 mounted thereon spaced from its end.

The numeral 24 denotes a pair of lugs fixed on the inner face of the tire 1 and apertured in alinement to seat a short operating shaft 27, having on its outer end a projecting end cross-pin 28 to seat in end notches 29 in a socket part 30 of a removable handled crank 31. Between the lugs 24 a gear 26 is fixed on the shaft 27 and in mesh with a bevel-pinion 25 mounted on the outer end of the screw-rod 21, a forked bearing member 23 being loosely mounted on said rod 21 and having its furcations apertured in alinement to seat them swingingly upon the shaft 27.

Referring to said Fig. 2, the tire 1 has transverse slots 2 spaced circumferentially, and as shown may be arranged in two rows with the slots staggered and to fit loosely the rectangular plate-like lugs 15. These lugs are slidably movable radially to and fro in slideways such as the turned over longitudinal margins 17 of transverse plates 16 whose edges are secured to the side plate projections 18 and therebetween. The inwardly projecting devices composed of the elements 18 and 16 fastened on the inner face of the tire are, like I-beams, very strong and rigid and suffice to give adequate support to the radially slidable plate-lugs 15 in any of their outwardly projected positions.

On each plate-lug 15 within the tire 1 is fixed an apertured ear 14 which receives an angularly bent termination 13 of a connecting-rod 11 whose angularly bent opposite termination 12 is pivotally seated in a bearing hole in the adjacent annulus 5 of the rotatable sleeve 8. In Fig. 1 the plate-lugs 15 are shown as projected outwardly beyond the tire 1 to their full extent, but in any position of the lugs 15 they are movable radially only, so that in use when projected adjustingly to a desired distance according to the condition of the surface traversed, they remain radial, therefore most effective in use in the forward or rearward movements of the traction wheel and vehicle as is evident.

The plate-lugs 15 are moved outwardly or inwardly as the case may be by application to the studded shaft 27 of the crank 31, and rotating the crank appropriately to likewise by means of the gearing 26 and 25 rotate the screw-rod 21 which works through the swinging block 19 to rock the arm 10 and the sleeve member 8 and 9. The connecting-rods 11 are thus swung to shift the plate-lugs 15 appropriately. The screw-rod locks the plate-rods in any adjusted position, and the opposite pairs of adjusting- and locking-nuts, 21' and 22 may be shifted and locked to limit the throw of the lugs 15 in or out.

Having described my invention, what I claim as new, and desire to secure by Letters Patent, is:

In a traction wheel, a tire therefor having circumferentially spaced apertures, radially directed fixed slideways in line with said apertures on the inner face of the tire, plate-lugs mounted slidably in said slideways to move through said apertures inwardly or outwardly of the tire, said wheel having a hub, a sleeve rotatably mounted thereon and having a radial arm, links between said sleeve and plate-lugs, a bearing-block rockingly mounted on said arm and having an interiorly threaded aperture, a screw-rod threaded and having one end seated in said threaded aperture, lugs fixed on the inner face of the tire, a bearing-block mounted rockingly on said lugs, the other end of the screw-rod being unthreaded and rotatably secured therein, and means for rotating said screw-rod in either of opposite directions.

In testimony whereof I affix my signature.

WILLIAM J. HANIG.